United States Patent
Khurana et al.

(10) Patent No.: US 7,424,334 B2
(45) Date of Patent: Sep. 9, 2008

(54) SYSTEM, METHOD, AND ARTICLE OF MANUFACTURE FOR DETERMINING A PROCESS PLAN FOR FORMING FEATURES IN A PART

(75) Inventors: Pravin Khurana, Rochester, MI (US); Raghunath P. Khetan, Troy, MI (US); Ravi Duggirala, Farmington Hills, MI (US)

(73) Assignee: Delphi Technologies, Inc., Troy, MI (US)

(*) Notice: Subject to any disclaimer, the term of this patent is extended or adjusted under 35 U.S.C. 154(b) by 65 days.

(21) Appl. No.: 11/302,533

(22) Filed: Dec. 13, 2005

(65) Prior Publication Data

US 2007/0038329 A1    Feb. 15, 2007

Related U.S. Application Data

(60) Provisional application No. 60/635,873, filed on Dec. 14, 2004, provisional application No. 60/636,450, filed on Dec. 14, 2004.

(51) Int. Cl.
*G06F 19/00* (2006.01)
(52) U.S. Cl. .............................. 700/97; 700/99; 700/100
(58) Field of Classification Search ............. 700/97–99, 700/100, 103; 718/102
See application file for complete search history.

(56) References Cited

U.S. PATENT DOCUMENTS

| | | | |
|---|---|---|---|
| 5,249,135 A * | 9/1993 | Fujita | 700/179 |
| 5,416,729 A | 5/1995 | Leon et al. | 364/578 |
| 5,465,221 A * | 11/1995 | Merat et al. | 702/83 |

(Continued)

FOREIGN PATENT DOCUMENTS

EP    0 811 941 A2    12/1997

(Continued)

OTHER PUBLICATIONS

Contemporaneously filed U.S. application for "System, Method, and Article of Manufacture for Determining a Productivity Rate of a Manufacturing System", filed Dec. 13, 2005.

(Continued)

*Primary Examiner*—Alexander J Kosowski
(74) *Attorney, Agent, or Firm*—Michael D. Smith (57) ABSTRACT

A system, method, and article of manufacture for determining a process plan for forming at least one feature in a part are provided. The method includes automatically identifying first and second features to be formed in the part by accessing first and second feature parameter data, respectively, stored in a CAD model of the part. The method further includes selecting at least a first manufacturing task identifier associated with a first manufacturing task for forming the first and second features in the part. The first manufacturing task identifier is selected from a plurality of manufacturing task identifiers stored in one or more databases. The method further includes selecting a first machine identifier associated with a first machine for performing at least the first manufacturing task, the first machine identifier being selected from a plurality of machine identifiers stored in one or more databases. The method further includes determining a first process plan for performing at least the first manufacturing task utilizing the first machine.

21 Claims, 11 Drawing Sheets

U.S. PATENT DOCUMENTS

| | | | |
|---|---|---|---|
| 5,841,659 A * | 11/1998 | Tanaka et al. | 700/121 |
| 5,974,392 A * | 10/1999 | Endo | 705/8 |
| 5,996,702 A | 12/1999 | Hall | 172/4.5 |
| 6,434,440 B1 * | 8/2002 | Teranishi et al. | 700/97 |
| 6,735,489 B1 | 5/2004 | Khurana | 700/95 |
| 6,775,581 B2 | 8/2004 | Landers | 700/98 |
| 6,839,606 B2 | 1/2005 | Landers | 700/159 |
| 6,950,719 B2 | 9/2005 | Landers | 700/182 |
| 7,099,737 B2 * | 8/2006 | Suh et al. | 700/174 |
| 2001/0034562 A1 * | 10/2001 | Aumer et al. | 700/97 |
| 2002/0107914 A1 * | 8/2002 | Charisius et al. | 709/203 |
| 2003/0109950 A1 * | 6/2003 | Andrade et al. | 700/103 |
| 2003/0114948 A1 * | 6/2003 | Hellemann et al. | 700/100 |

FOREIGN PATENT DOCUMENTS

| | | |
|---|---|---|
| EP | 1 443 434 A2 | 8/2004 |
| JP | 2001222311 | 8/2001 |
| WO | WO 96/35187 | 11/1996 |
| WO | WO 02/21450 A1 | 3/2002 |

OTHER PUBLICATIONS

Contemporaneously filed U.S. application for "System, Method, and Article of Manufacture for Generating a CAD Model Indicating an Amount of Material Added or Removed From a Part to Form a Feature in the Part", filed Dec. 13, 2005.

International Search Report, PCT/US2005/045141, May 15, 2006.

International Search Report, PCT/US2005/045143, Apr. 25, 2006.

Bhandarkar M P et al: "STEP-based feature extraction from STEP geometry for agile manufacturing" Computers in Industry Elsevier Netherlands, [Online] vol. 41, No. 1, Jan. 2000.

* cited by examiner

Process Plan Verification Results

| Feature | Problem |
|---|---|
| PART | No Process |

| Feature | Process | Process Type | Parameter | Requirement | Capability |
|---|---|---|---|---|---|
| RADIAL_SLOT | Endmill | Rough | negativeTolerance | 0.0500 | 0.1000 |
| RADIAL_SLOT | Endmill | Finish | positiveTolerance | 0.0500 | 0.1000 |
| AXIAL_SLOT | Endmill | Finish | perpendicularity | 0.0150 | N/A |
| | | | symmetry | 0.0120 | N/A |

| PATH SEGMENT # | FEED TYPE | DISTANCE | START TURN DIA. | END TURNING DIA. |
|---|---|---|---|---|
| 1 | RAPID | 5.0 | 12.0 | 12.0 |
| 2 | FEED | 0.8 | 12.0 | 13.0 |
| 3 | FEED | 4.0 | 13.0 | 13.0 |
| 4 | FEED | 0.5 | 13.0 | 14.0 |
| 5 | FEED | 2.0 | 14.0 | 17.0 |
| 6 | RAPID | 5.0 | 17.0 | 22.0 |

SYSTEM, METHOD, AND ARTICLE OF MANUFACTURE FOR DETERMINING A PROCESS PLAN FOR FORMING FEATURES IN A PART

CROSS REFERENCE TO RELATED APPLICATIONS

The application claims the benefit of U.S. Provisional application, Ser. No. 60/635,873, filed Dec. 14, 2004, the contents of which are incorporated herein by reference thereto.

The application also claims the benefit of U.S. Provisional application, Ser. No. 60/636,450, filed Dec. 14, 2004, the contents of which are incorporated herein by reference thereto.

TECHNICAL FIELD

This application relates to a system, method, and article of manufacture for generating a process plan for forming feature in a part.

BACKGROUND

Manufacturing engineers generally determine a manufacturing process plan after a prototype part has been constructed. Further, the manufacturing engineer may not develop an optimal manufacturing process plan since they may not be aware of equipment not currently utilized in the manufacturing facility that could improve the process plan. Further, the engineer may not be cognizant of all of the features to be formed in the part because the prototype part may not contain all of the features of a production part.

Accordingly, there is a need for an improved method for generating a manufacturing process plan without utilizing a prototype part.

SUMMARY

A method for determining a process plan for forming at least one feature in a part in accordance with exemplary embodiment is provided. The method includes automatically first and second features to be formed in the part by accessing first and second feature parameter data, respectively, stored in a CAD model of the part. The method further includes selecting at least a first manufacturing task identifier associated with a first manufacturing task for forming the first and second features in the part. The first manufacturing task identifier is selected from a plurality of manufacturing task identifiers stored in one or more databases. The method further includes selecting a first machine identifier associated with a first machine for performing at least the first manufacturing task, the first machine identifier being selected from a plurality of machine identifiers stored in one or more databases. The method further includes determining a first process plan for performing at least the first manufacturing task utilizing the first machine.

A system for determining a process plan for forming at least one feature in a part in accordance with another exemplary embodiment is provided. The system includes a CAD database storing a CAD model of a part. The system further includes a computer operably coupled to the CAD database. The computer is configured to automatically identify first and second features to be formed in the part by accessing first and second feature parameter data, respectively, stored in the CAD model of the part. The computer is further configured to allow selection of at least a first manufacturing task identifier associated with a first manufacturing task for forming the first and second features in the part. The first manufacturing task identifier is selected from the plurality of manufacturing task identifiers stored in one or more databases. The computer is further configured to allow selection of a first machine identifier associated with a first machine for performing at least the first manufacturing task. The first machine identifier is selected from the plurality of machine identifiers stored in one or more databases. The computer is further configured to determine the first process plan for performing at least the first manufacturing task utilizing the first machine.

An article of manufacture in accordance with another exemplary embodiment is provided. The article of manufacture includes a computer storage medium having a computer program encoded therein for determining a process plan for forming at least one feature in a part. The computer storage medium includes code for automatically identifying first and second features to be formed in the part by accessing first and second feature parameter data, respectively, stored in a CAD model of the part. The computer storage medium further includes code for selecting at least a first manufacturing task identifier associated with a first manufacturing task for forming the first and second features in the part. The first manufacturing task identifier is selected from a plurality of manufacturing task identifiers stored in one or more databases. The computer storage medium further includes code for selecting a first machine identifier associated with a first machine for performing at least the first manufacturing task. The first machine identifier is selected from a plurality of machine identifiers stored in one or more databases. The computer storage medium further includes code for determining a first process plan for performing at least the first manufacturing task utilizing the first machine.

DESCRIPTION OF EXEMPLARY EMBODIMENTS

Figure 1:
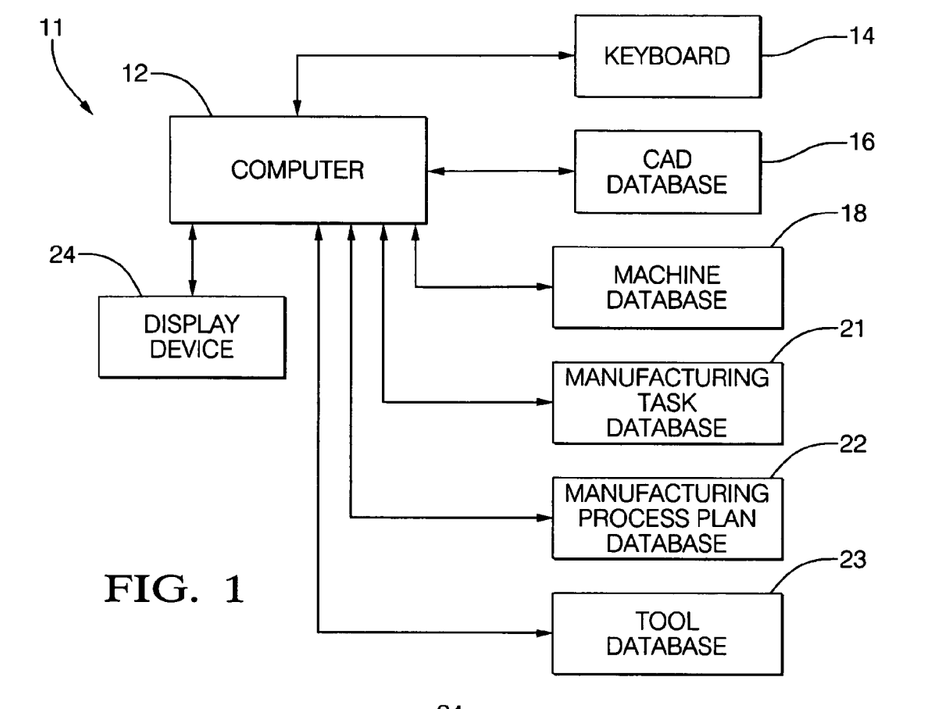
FIG. 1 is a schematic of a system for generating a process plan for forming features in a part.
Figure 2:
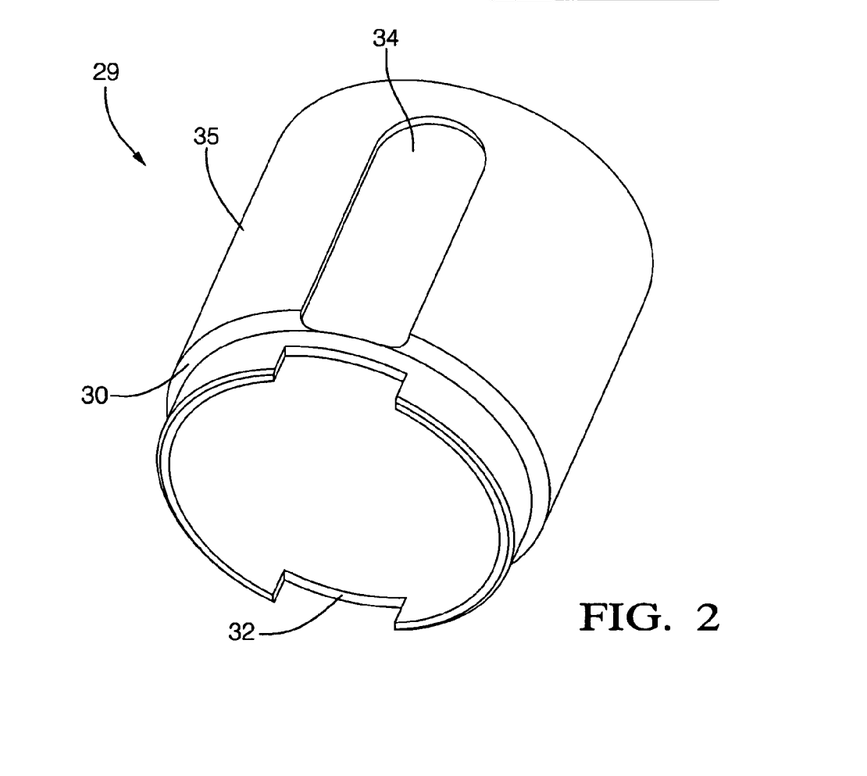
FIG. 2 is a schematic of a feature-based CAD model of a part utilized by the system of FIG. 1.

Referring to FIGS. 1 and 2, a system 11 for generating a process plan for forming features in a part and for determining machine cycle times for forming features in the part is illustrated. In particular, the system 11 utilizes a feature-based computer aided design (CAD) model of a part for both generating a process plan or sequence of steps for forming physical features in the part and for determining machine cycle times for forming the features. The 3-D CAD model includes feature attributes, hereinafter referred to as "features", corresponding to the physical features of the part. Each feature includes feature parameter data associated therewith for defining the feature including a feature name and dimensional data. For example, the CAD model 29 includes a feature 30 having a feature name OD_GROOVE, a feature 32 having a feature name RADIAL_SLOT, a feature 34 having a feature name AXIAL_SLOT, and a feature 35 having a feature name OD_CHAMFER. The system 11 includes a computer 12, a keyboard 14, a CAD database 16, a machine database 18, a manufacturing task database 21, a manufacturing process plan database 22, a tool database 23, and a display device 24.

The computer 12 is provided to assist an operator in generating a process plan for forming features in a part and for determining manufacturing cycle times for forming the features in the part. The computer 12 is operably coupled to the keyboard 14. The computer 12 is further operably coupled to a display device 24 for displaying computer screens 40, 50, 60, 80, and 90 for querying the operator to select process information such as manufacturing task identifiers, machine identifiers, tool identifiers, and a task sequence. The computer is further operably coupled to the CAD database 16, the machine database 18, the manufacturing task database 21, the manufacturing process plan database 22, and the tool database 23.

The CAD database 16 is provided for storing feature-based CAD models of parts. A feature-based CAD model is a mathematical representation of a part having a plurality of editable features generated by feature modeling. Feature modeling is an ability to build up a CAD model by adding and connecting the plurality of editable features. Not all CAD software supports this capability. For example, AutoCAD uses a wireframe-and-surface methodology to build models rather than feature modeling. One important aspect of feature modeling is the generation of associative relationships between features, meaning the features are linked such that changes to one feature may alter the others to which it is associated. In particular, the CAD databases 16 stores CAD model 29 therein. The computer 12 operably communicates with the CAD database 16 for retrieving predetermined CAD models therein.

The machine database 18 is provided for storing machine identifiers associated with machines. In particular, the machine identifiers comprise machines names or machine numbers identifying predetermined machines used in a manufacturing process. The computer 12 operably communicates with the machine database 18 for retrieving predetermined machine identifiers stored therein.

The manufacturing task data base 21 is provided for storing a plurality of process task names for forming physical features in a part. The computer 12 operably communicates with the manufacturing task database 21 for retrieving process task names stored therein.

The manufacturing process plan database 22 is provided for storing a process plan determined by an operator utilizing the system 11. The computer 12 operably communicates with the manufacturing process plan database 22 for storing data associated with a generated process plan therein.

The tool database 23 is provided for storing tool identifiers, such as tool names, associated with tools that can be utilized with the one more selected machines. The computer 12 operably communicates with the tool database 23 for retrieving tool identifiers stored therein.

Before proceeding with a detailed discussion of a method for determining machine cycle times for forming features in a part, a brief description of the computer screens generated by the computer 12 for assisting an operator in generating the process plan and for determining the machine cycle times will now be described.

Figure 3:
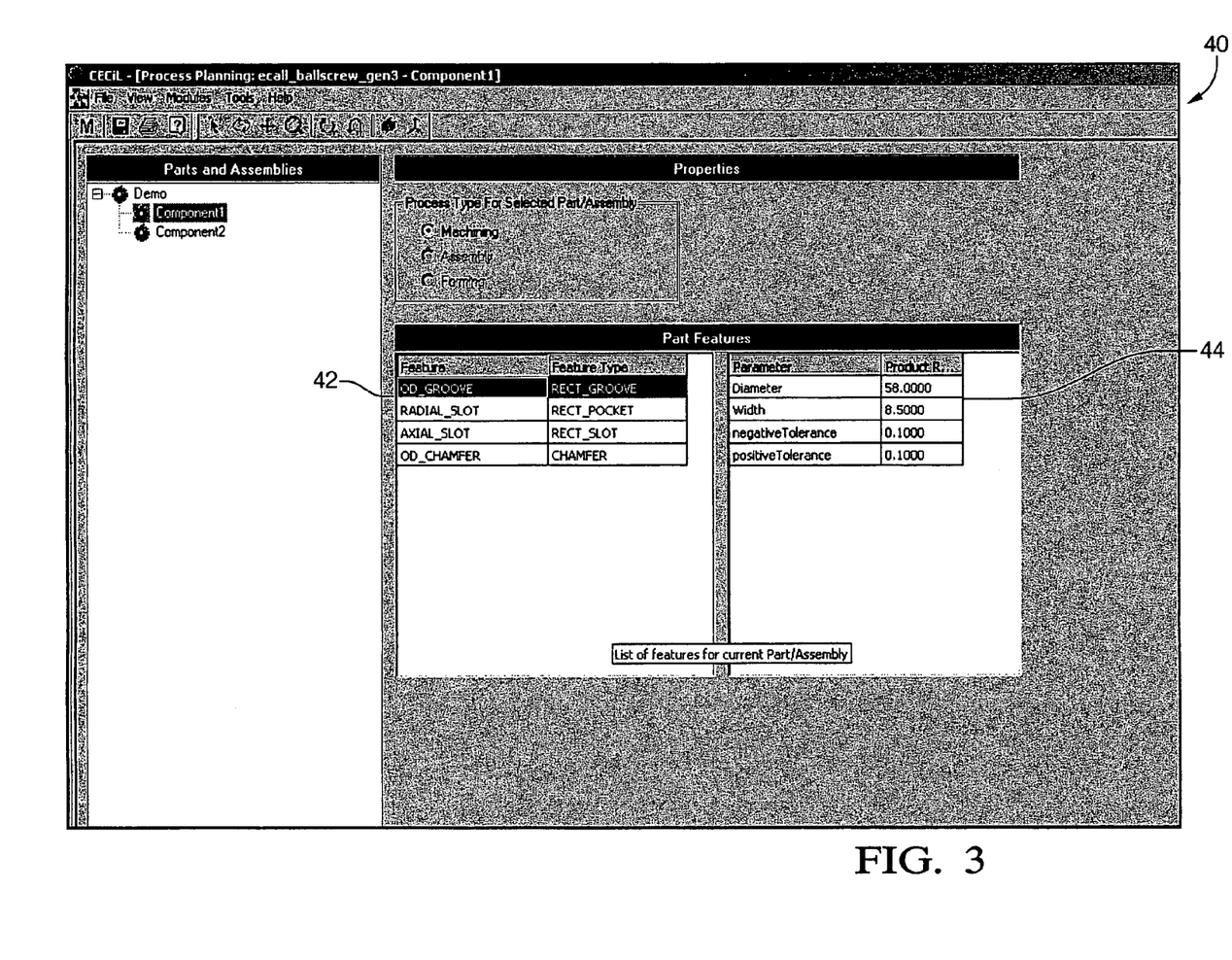
FIG. 3 is a schematic of a first computer screen generated by the system of FIG. 1.

Referring to FIG. 3, a computer screen 40 includes a feature menu 42 and a feature parameter menu 44. The feature menu 42 illustrates a plurality of records having the features names OD_GROOVE, RADIAL_SLOT, AXIAL_SLOT, and OD_CHAMFER that are associated with the CAD model 29. The feature parameter menu 44 lists the other feature parameter data associated with one selected feature name in the feature menu 42.

Figure 4:
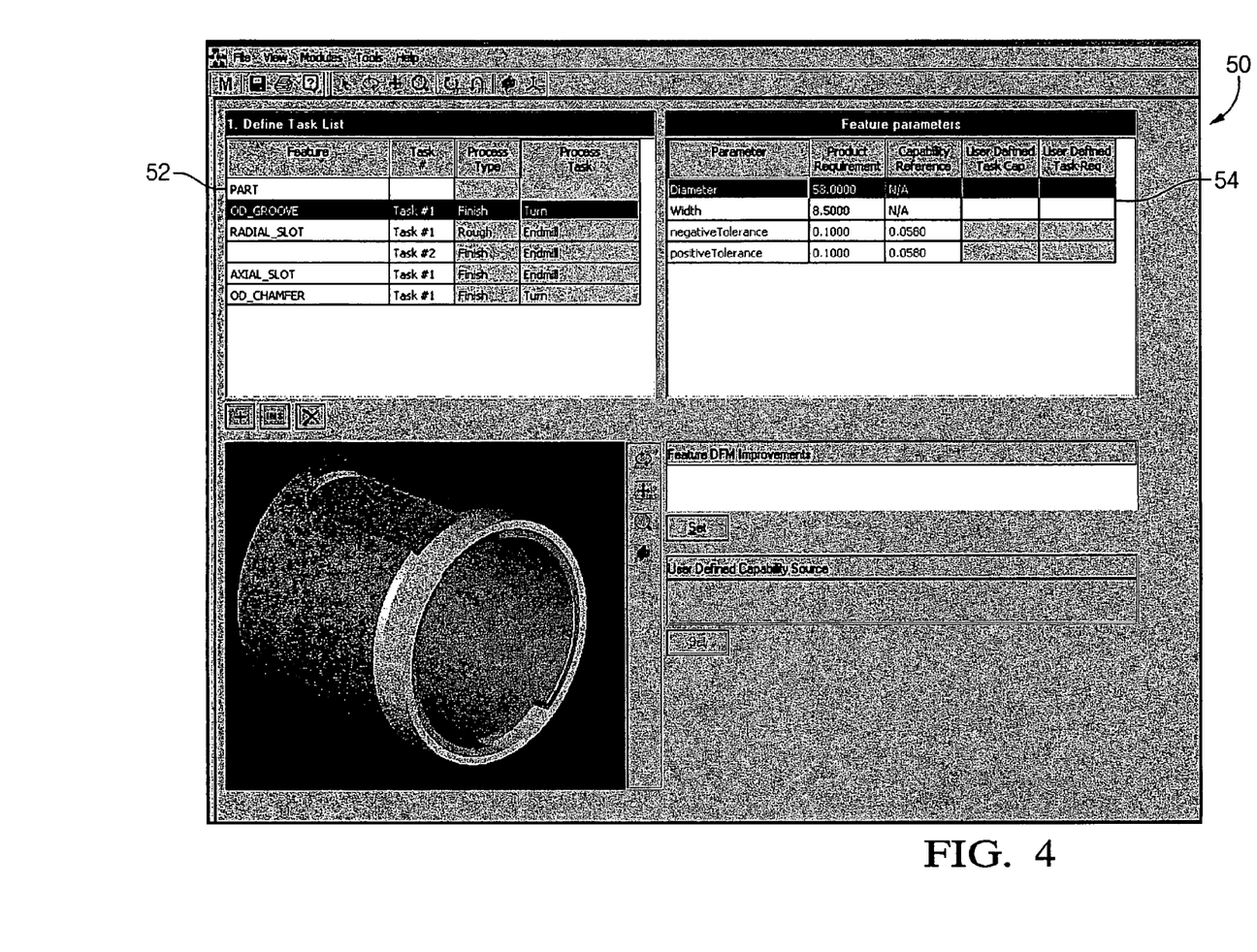
FIG. 4 is a schematic of a second computer screen generated by the system of FIG. 1.

Referring to FIG. 4, a computer screen 50 includes a task list menu 52 and a feature parameter menu 54. The task list menu 52 lists a plurality of records wherein each record has a feature name field, a task number field, a process type identifier field, and a task identifier field. For each listed record on menu 52, the operator can select (i) a task number from a plurality of task numbers, (ii) a process type identifier from a plurality of process type identifiers, and (iii) a task identifier (e.g., process task name) from a plurality of task identifiers stored in the database 21. The feature parameter menu 54 lists the other feature parameter data associated with one selected feature name in the feature menu 52.

Figure 5:
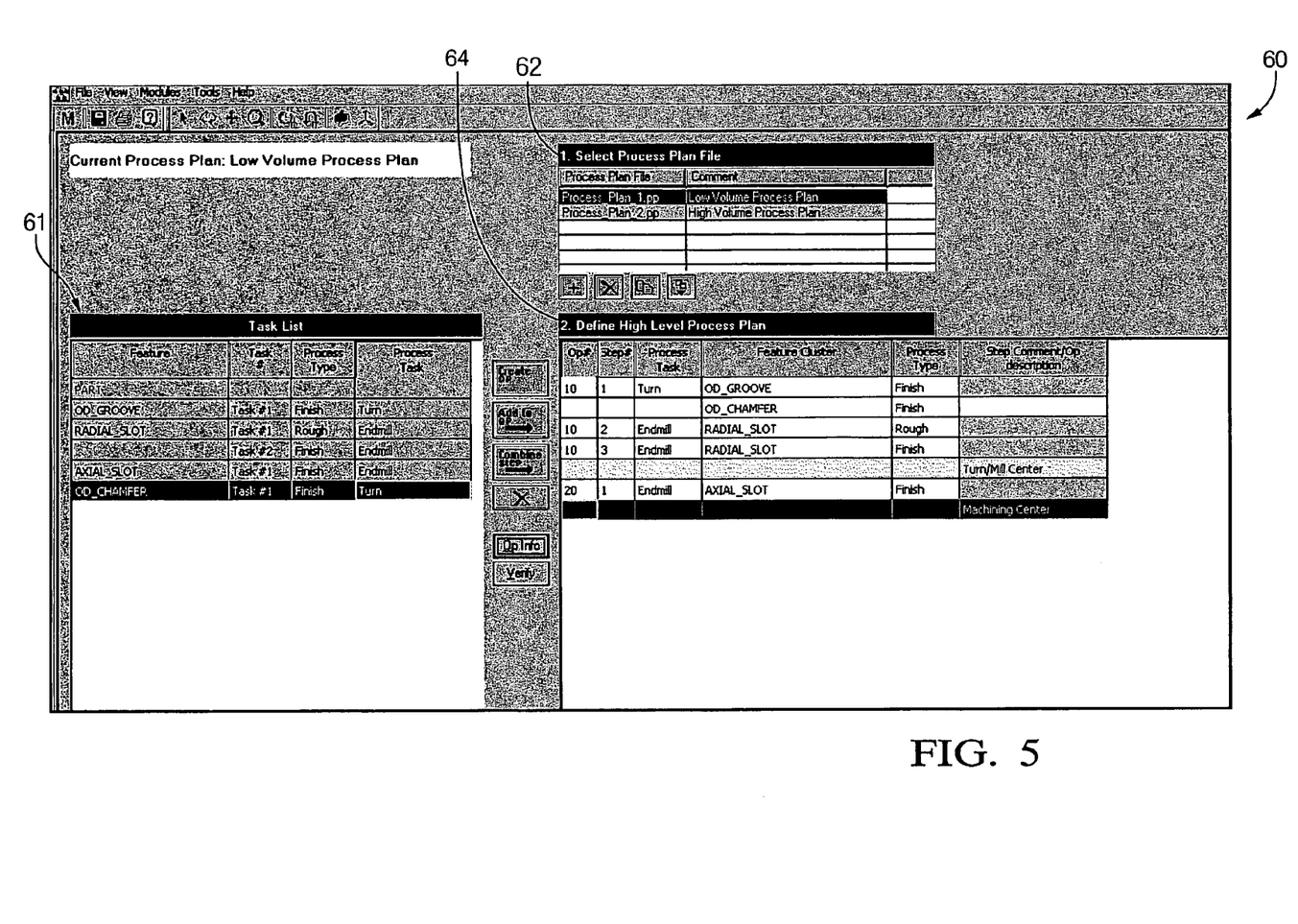
FIG. 5 is a schematic of a third computer screen generated by the system of FIG. 1.

Referring to FIG. 5, a computer screen 60 includes a select process plan file menu 62 and a define high-level process plan menu 64. The menu 62 allows an operator to generate a process plan file that will contain a developed process plan. Each process plan file represents a unique grouping of tasks for one or more machine used in a manufacturing process. Accordingly, an operator can generate a plurality of different process plans for different manufacturing volumes and machines. The menu 64 lists a plurality of records wherein each record comprises (i) a machine identifier (e.g. an OP #) from a plurality of machine identifiers, (ii) a step number indicating when a selected machine will perform a task during execution of a plurality of steps, (iii) a process task identifier (e.g., process task name) from a plurality of task identifiers, (iv) a feature cluster wherein an operator can group one or more feature names with a process task identifier, and (v) a process type from a plurality of process types associated with each particular process task identifier. The menu 64 allows a user to assign a process task identifier from the process task names menu 61 to both a machine identifier and a step number.

Figure 6:
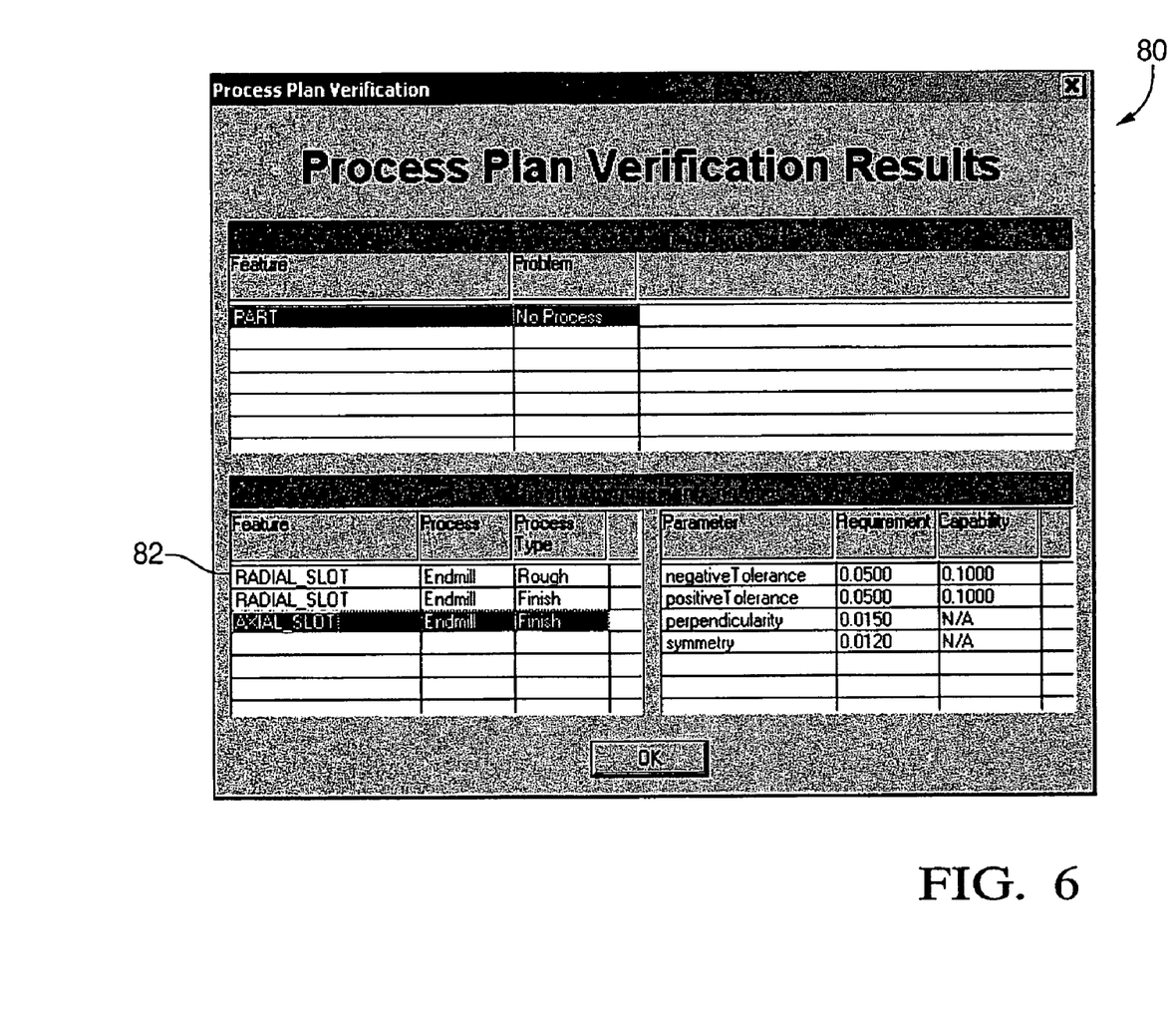
FIG. 6 is a schematic of a fourth computer screen generated by the system of FIG. 1.

Referring to FIG. 6, a computer screen 80 includes a process plan verification results section 82 that indicates features of the CAD model 29 having desired tolerances that are not within a manufacturing tolerance capability of a selected machine and manufacturing process.

Figure 7:
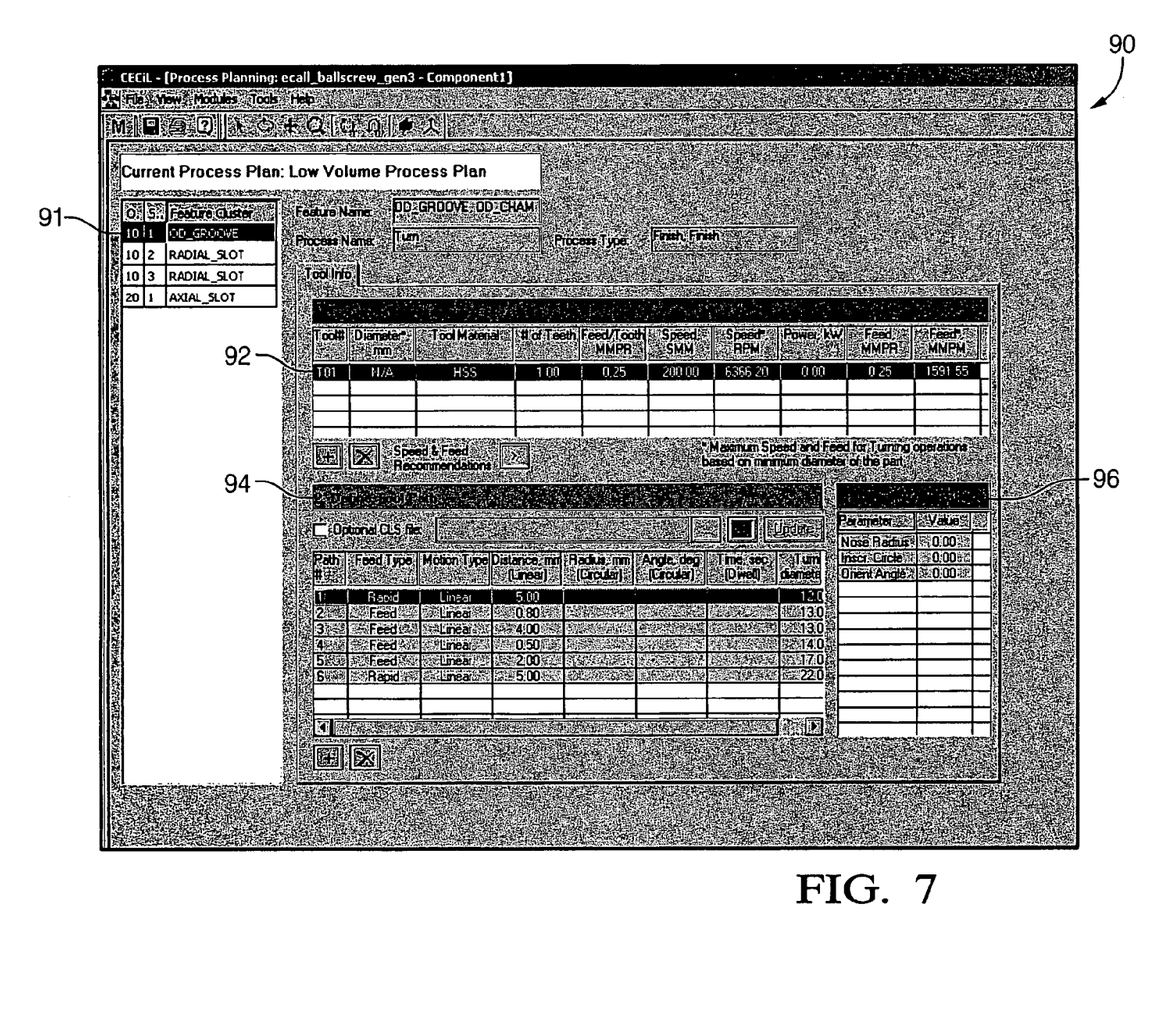
FIG. 7 is a schematic of a fifth computer screen generated by the system of FIG. 1.

Referring to FIG. 7, a computer screen 90 includes a feature selection menu 91, a define tool definition menu 92, a define tool path menu 94, and a tool visualization menu 96. The menu 91 allows an operator to select a feature for subsequently allowing a user to select a tool identifier (e.g., tool #) associated with a tool for forming the selected feature. As shown, the menu 92 includes a tool definition record having a tool number field, a diameter field, a tool material field, a number of teeth field, a feed-tooth field, first and second speed fields, a power field, and first and second feed rate fields. The tool identifier selected in the menu 92 is associated with the feature selected in the menu 91. The menu 94 allows a user to define a tool path that will be utilized by the tool selected in the menu 92 for forming predetermined features.

Figure 8:
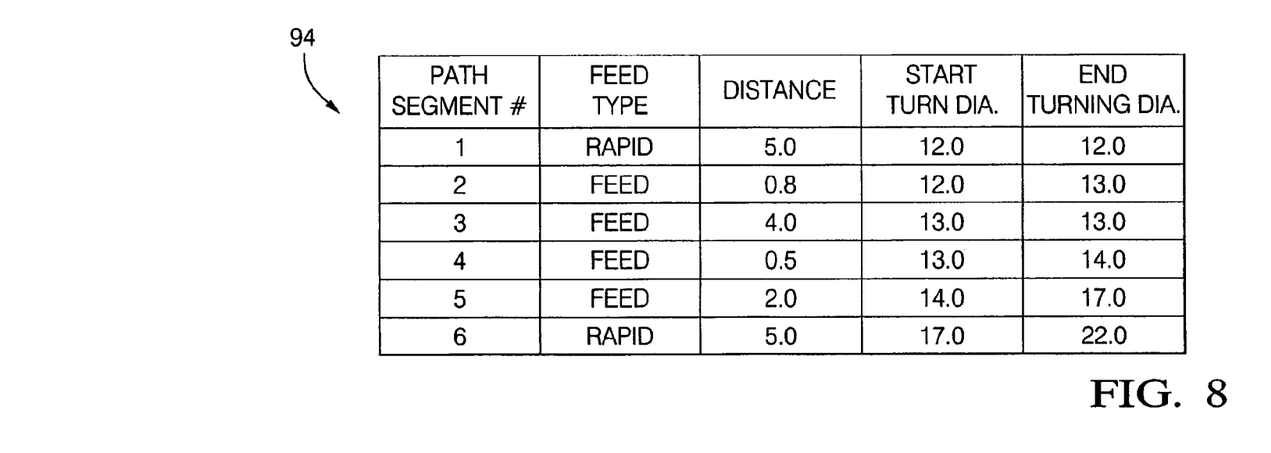
FIG. 8 depicts a portion of the fifth computer screen of FIG. 7.
Figure 9:
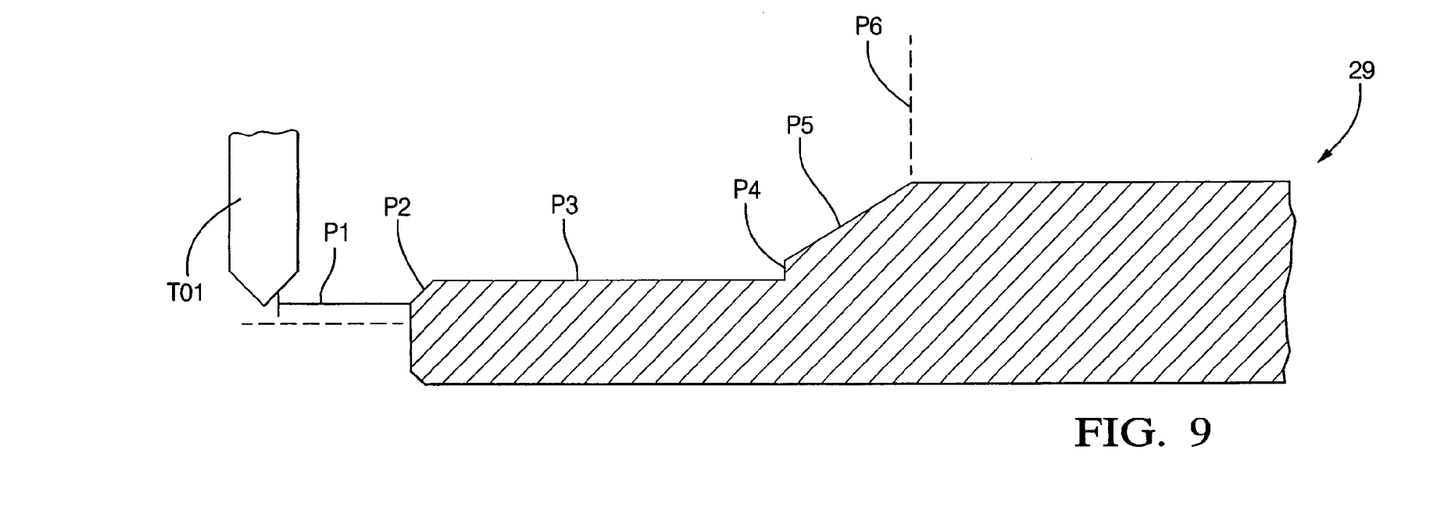
FIG. 9 depicts a portion of the CAD model of FIG. 2.

Referring to FIGS. 8 and 9, an exemplary menu 94 for determining a tool path for the tool T01 for forming the features 30, 35 corresponding to the OD_GROOVE and OD_CHAMFER feature names, are illustrated. The menu 94 includes a plurality of records wherein each record defines a path travel segment for the tool T01. Further, each of the records includes a travel path segment number field, a feed type field, a distance field, a start turn diameter field, and an end turning diameter field. The path segment numbers 1, 2, 3, 4, 5, 6 corresponds to one of the travel path segments P1, P2, P3, P4, P5, P6, respectively. The feed type field can contain either a value of "rapid" corresponding to a first predetermined linear cutting speed or a value of "feed" corresponding to a second predetermined linear cutting speed that is less than the first predetermined linear cutting speed. The distance field corresponds to tool travel distance in a path travel segment. The start turning diameter corresponds to a diameter of the part in a first end of the path travel segment. The end turning diameter corresponds to a diameter of the part at a second end of the corresponding path travel segment. It should be noted that development of one tool path for tool TO1 described in detail, the menu 94 would also be used for developing a tool path for each other selected tool.

Figure 10:
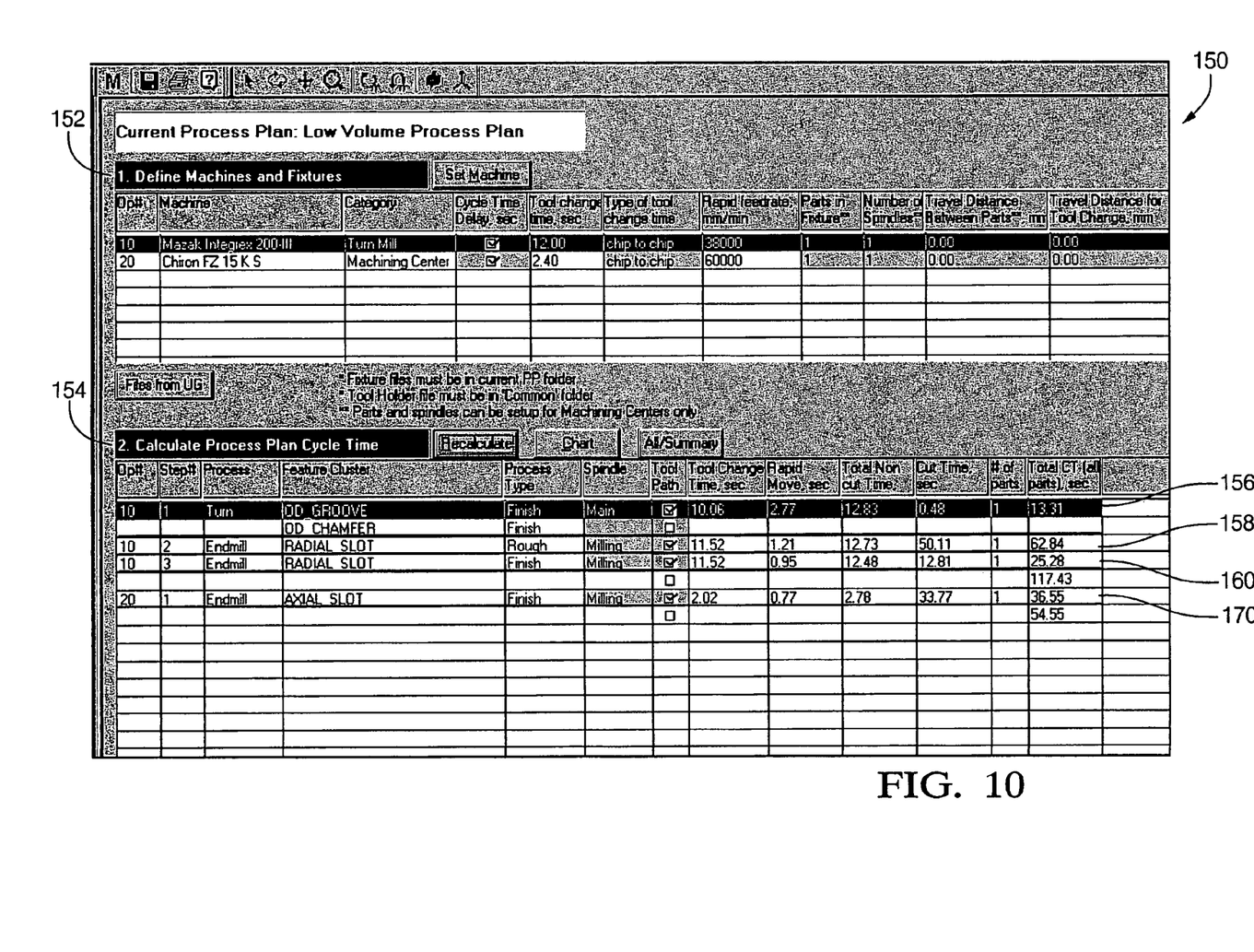
FIG. 10 is a schematic of a sixth computer screen generated by the system of FIG. 1.

Referring to FIG. 10, a computer screen 150 includes a define machines and fixtures menu 152 and a process plan cycle time menu 154. The menu 152 allows an operator to define the parameters associated with the machine identifiers 10 and 20 associated with first and second machines, respectively, that are selected for forming features in a part. As shown, each record in the menu 152 includes a machine identifier field, a machine name field, a category field, a cycle time delay field, a too change time field, a type of tool change time field, a rapid feed rate field, a parts in fixture field, a number of spindles field, a travel distance between parts field, and a travel distance for tool change field.

The menu 154 is provided for displaying a plurality of records wherein each record contains a calculated cycle time for forming one or more features of the part. Further, menu 154 displays a calculated total cycle time for each machine used to form features in the part. Each of the records displayed in the menu 154 includes a machine identifier field, a step number field, a process task field, a feature cluster field, a process type field, a spindle field, a tool path field, a tool change time field, a rapid move time field, a total non-cut time field, a cut time field, a number of parts field, and a calculated cycle time field.

Referring to FIGS. 11-13 and FIGS. 3-7, and 10, a method for determining a process plan for formation features in a part and for determining machine cycle times for forming features in the part will now be described. The method is implemented in a software program configured to execute on the computer 12 of the system 11.

Figure 11:
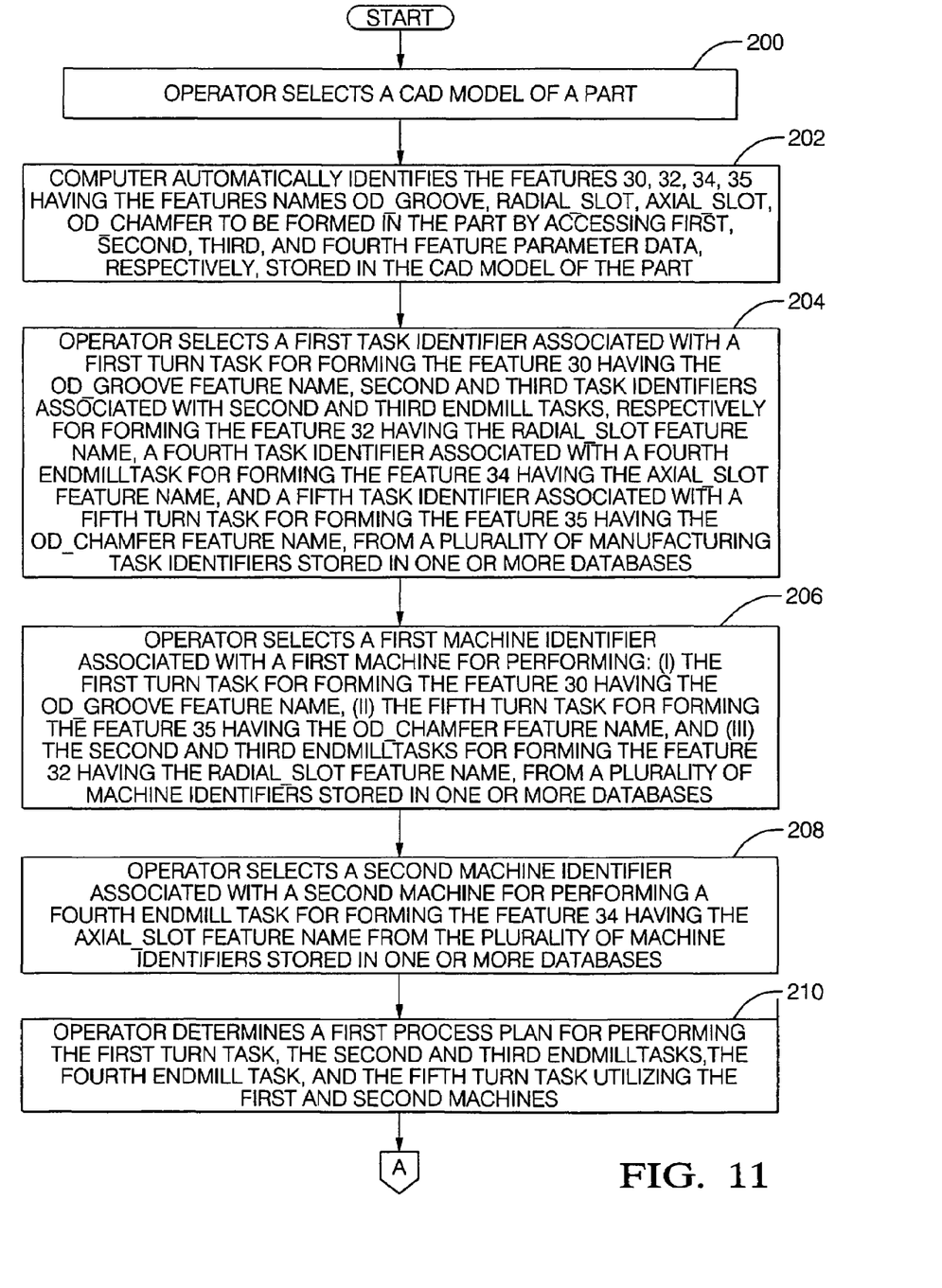
FIGS. 11-13 are flowcharts of a method for generating a process plan for forming features in a part.
Figure 12:
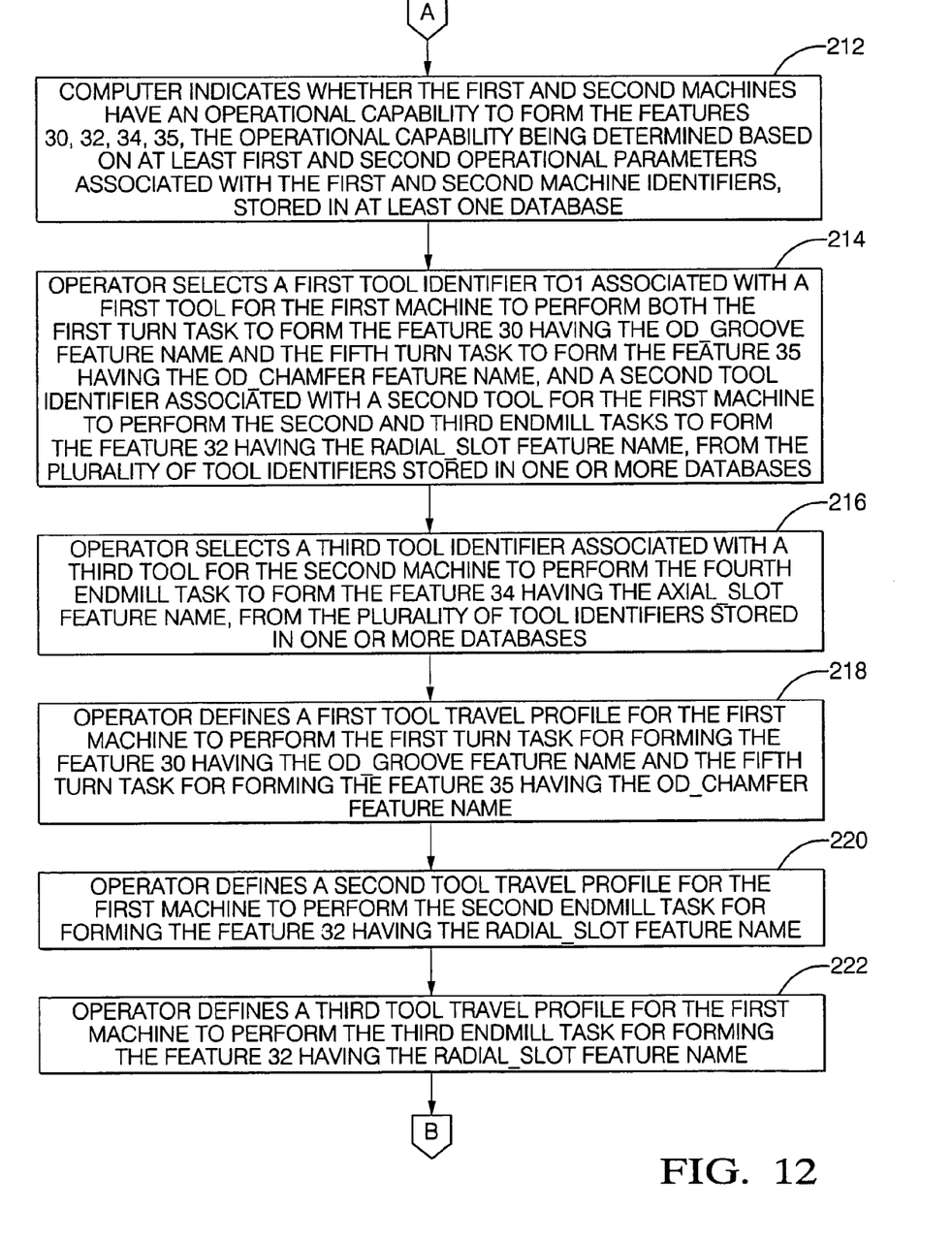
Figure 13:
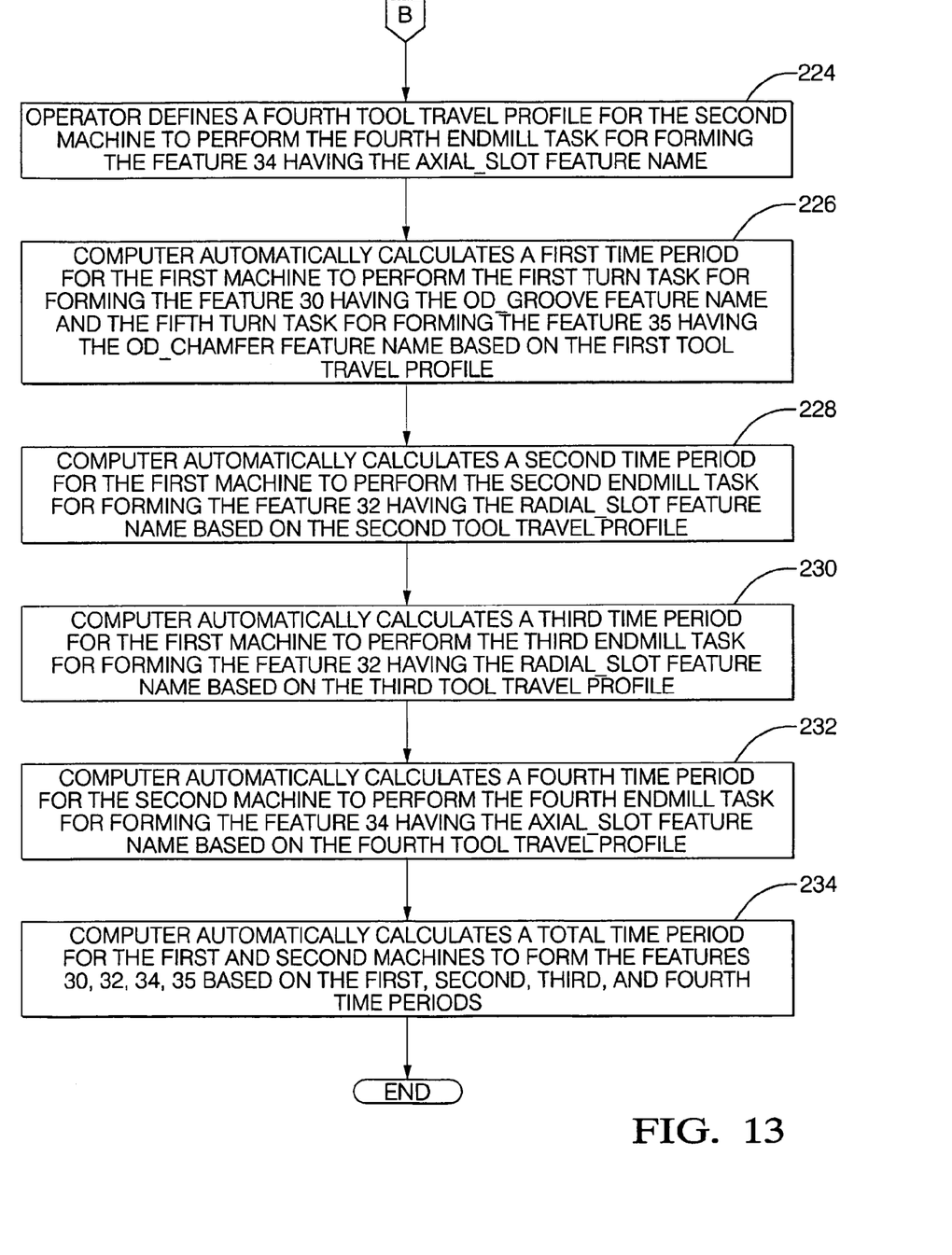

At step 200, an operator selects the CAD model 29 of a part utilizing the keyboard 14. Thereafter, the computer 12 retrieves the CAD model 29 from the CAD database 16.

Next at step 202, the computer 12 automatically identifies the features 30, 32, 34, 35 having the features names OD_GROOVE, RADIAL_SLOT, AXIAL_SLOT, OD_CHAMFER, respectively, to be formed in the part by accessing first, second, third, and fourth feature parameter data, respectively, stored in the CAD model of the part. The foregoing feature names are displayed in the menu 42 of the computer screen 40.

Next at step 204, the operator selects a first task identifier associated with a TURN task for forming the feature 30 having the OD_GROOVE feature name, second and third task identifiers associated with second and third ENDMILL tasks, respectively, for forming the feature 32 having the RADIAL_SLOT feature name; a fourth task identifier associated with a fourth ENDMILL task for forming the feature 34 having the AXIAL_SLOT feature name; and a fifth task identifier associated with a fifth TURN task for forming the feature 35 having the OD_CHAMFER feature name, from a plurality of manufacturing task identifiers stored in one or more databases. In particular, the operator makes the foregoing task selections utilizing the menu 52 of the computer screen 50.

Next at step 206, an operator selects a machine identifier 10 associated with a first machine for performing: (i) the first TURN task for forming the feature 30 having the OD_GROOVE feature name, (ii) the fifth TURN task for forming the feature 35 having the OD_CHAMFER feature name, and (iii) the second and third ENDMILL tasks for forming the feature 32 having the RADIAL_SLOT feature name, from a plurality of machine identifiers stored in one or more databases. In particular, the operator makes the foregoing machine identifier selection utilizing the menu 64 of the computer screen 60.

Next at step 208, an operator selects a machine identifier 20 associated with a second machine for performing a fourth ENDMILL task for forming the feature 34 having the AXIAL_SLOT feature name from the plurality of machine identifiers stored in one or more databases. In particular, the operator makes the foregoing machine identifier selection utilizing the menu 64 of the computer screen 60.

Next at step 210, the operator determines a first process plan for performing the first TURN task, the second and third ENDMILL tasks, the fourth ENDMILL task, and the fifth TURN task utilizing the first and second machines associated with machine identifiers 10 and 20. In particular, the operator determines the first process plan by ordering the process tasks associated with each machine identifier listed on the menu 64 of the computer screen 60.

Next at step 212, computer 12 indicates whether the first and second machines associated with machine identifiers 10 and 20, respectively, have an operational capability to form the features 30, 32, 34, 35. The operational capability is determined based on at least first and second operational parameters associated with the first and second machines having machine identifiers 10, 20, respectively, stored in the database 18. In particular, the computer 12 generates the computer screen 80 including the process plan verification results section 82 that indicates features of the CAD model 29 having a desired tolerance that is not within a manufacturing tolerance capability of a selected machine identifier.

Next at step 214, the operator selects a first tool identifier T01 associated with a first tool for the machine 10 to perform both the first TURN task to form the feature 30 having the OD_GROOVE feature name and the fifth TURN task to form the feature 35 having the OD_CHAMFER feature name, and a second tool identifier (not shown) associated with a second tool for the machine 10 to perform the second and third ENDMILL tasks to form the feature 32 having the RADIAL_SLOT feature name, from the plurality of tool identifiers stored in the database 18. In particular, the operator makes the foregoing tool identifier selection utilizing the computer screen 90.iden.

Next at step 216, the operator selects a third tool identifier (not shown) associated with a third tool for the machine 20 to perform the fourth ENDMILL task to form the feature 34 having the AXIAL_SLOT feature name, from the plurality of tool identifiers stored in the database 18. In particular, the operator makes the foregoing tool identifier selection utilizing the computer screen 90.

Next at step 218, the operator defines a first tool travel profile for the machine 10 to perform the first TURN task for forming the feature 30 having the OD_GROOVE feature name and the fifth TURN task for forming the feature 35 having the OD_CHAMFER feature name. In particular, the operator defines the first tool travel profile utilizing the menu 94 of the computer screen 90.

Next at step 220, the operator defines a second tool travel profile (not shown) for the machine 10 to perform the second ENDMILL task for forming the feature 32 having the RADIAL_SLOT feature name. In particular, the operator defines the second tool travel profile utilizing the menu 94 of the computer screen 90.

Next at step 222, the operator defines a third tool travel profile (not shown) for the machine 10 to perform the third ENDMILL task for forming the feature 32 having the RADIAL_SLOT feature name. In particular, the operator defines the third tool travel profile utilizing the menu 94 of the computer screen 90.

Next at step 224, the operator defines a fourth tool travel profile (not shown) for the machine 20 to perform the fourth ENDMILL task for forming the feature 34 having the AXIAL_SLOT feature name. In particular, the operator defines the fourth tool travel profile utilizing the menu 94 of the computer screen 90.

Next at step 226, the computer 12 automatically calculates a first time period for the machine 10 to perform the first TURN task for forming the feature 30 having the OD_GROOVE feature name and the fifth TURN task for forming the feature 35 having the OD_CHAMFER feature name based on the first tool travel profile. In particular, the computer 12 automatically calculates the first time period corresponding to a cycle time of the machine 10 performing the features 30, 35 and displays the first time period in the record 156 on the menu 154. The first time period is calculated by determining a travel time for a tool during each travel path segment associated therewith and then summing each travel time to one another. For example, the travel time for the tool T01 when traversing the travel path segment P1 equals the distance of P1 divided by the speed the tool T01 when traversing the segment P1. The travel times for the tool T01 when traversing the travel path segments P2, P3, P4, and P5 can be calculated in a similar fashion. Thereafter, the first timer period is calculated by summing each travel time to one another. It should be noted that the speed of a tool can vary while progressing through a travel path segment.

Next at step 228, the computer 12 automatically calculates a second time period for the machine 10 to perform the second ENDMILL task for forming the feature 32 having the RADIAL_SLOT feature name based on the second tool travel profile. In particular, the computer 12 automatically calculates the second time period corresponding to a cycle time of the machine 10 performing the feature 32 and displays the second time period in the record 158 on the menu 154.

Next at step 230, the computer 12 automatically calculates a third time period for the machine 10 to perform the third ENDMILL task for forming the feature 32 having the RADIAL_SLOT feature name based on the third tool travel profile. In particular, the computer 12 automatically calculates the third time period corresponding to a cycle time of the machine 10 performing the features 32 and displays the third time period in the record 160 on the menu 154.

Next at step 232, the computer 12 automatically calculates a fourth time period for the machine 20 to perform the fourth ENDMILL task for forming the feature 34 having the AXIAL_SLOT feature name based on the fourth tool travel profile. In particular, the computer 12 automatically calculates the fourth time period corresponding to a cycle time of the machine 20 performing the features 34 and displays the fourth time period in the record 170 on the menu 154.

At step 234, the computer 12 automatically calculates a total time period for the machines 10, 20 to form the features 30, 32, 34, 35 based on the first, second, third, and fourth time periods. In particular, the computer 12 calculates a time period for the machine 10 to form the features 30, 38, 35 by adding the first, second, and third time periods, Further, the computer 12 calculates a time period for the machine 20 to form the feature 34 based on the fourth time period. After step 234 is exited.

A computer-readable storage medium accessed by the computer 12 will store a series of computer-executable instructions which will implement the above-described method. The computer-readable storage medium can comprise any device capable of storing computer executable instructions. For example, the computer readable storage medium can comprise a RAM or ROM of the computer, a computer diskette, a CD ROM, a flash memory device, a magnetic tape, a conventional hard disk drive, and an optical storage device, or the like.

In contrast to the above-described method, manufacturing engineers generally determine a cycle time for a machine to form a feature in a part by physically measuring the cycle time of the machine with a clock. Accordingly, the cycle time is determined after the machine has been installed in a manufacturing facility and is operational. A disadvantage with this approach, however, is that if the cycle time of the machine is greater than a desired cycle time, the manufacturing engineer may have to modify the machine or an assembly line after the machine has been installed on the assembly line, which can delay the production date for manufacturing the part. Further, any modification to the machine after installation can result in dramatically increased expenses related to the machine. Accordingly, the inventive system and a method solves this problem by allowing a manufacturing engineer to predict a cycle time for a machine to form one or more features in a part without having to measure an actual cycle time of the machine.

The system and the method for generating a process plan for forming features in a part provide a substantial advantage over other systems and methods. In particular, the system provides a list of all the features to be formed in a part to an operator before a prototype part is generated. Further, the system allows an operator to select one or more manufacturing tasks from a plurality of manufacturing tasks stored in a database for forming each of the listed features, thus augmenting the operator's knowledge of available manufacturing tasks when developing the process plan. Further, the system allows an operator to select one or more machine identifiers associated with machines for performing the one or more manufacturing tasks from a plurality of machine identifiers stored in a database for forming the features, thus augmenting the operator's knowledge of available machine identifiers when developing the process plan. Still further, the system allows an operator to evaluate cycle times for different process plans to select the process plan with a lowest cycle time.

What is claimed is:

1. A method for determining a process plan for forming at least one feature in a part, comprising:
   automatically identifying first and second features to be formed in the part by accessing first and second feature parameter data, respectively, stored in a CAD model of the part;

displaying a plurality of manufacturing task identifiers in a first menu on a display device, the plurality of manufacturing task identifiers being stored in one or more databases;

selecting at least a first manufacturing task identifier from the plurality of manufacturing task identifiers utilizing the first menu, the first manufacturing task identifier being associated with a first manufacturing task for forming the first and second features in the part;

displaying a plurality of machine identifiers in a second menu on the display device, the plurality of machine identifiers being stored in one or more databases;

selecting a first machine identifier from the plurality of machine identifiers utilizing the second menu, the first machine identifier being associated with a first machine for performing at least the first manufacturing task; and determining a first process plan for performing at least the first manufacturing task utilizing the first manufacturing task identifier and the first machine identifier; and storing the first process plan in one or more databases.

2. The method of claim 1, further comprising:

selecting a second machine identifier from the plurality of machine identifiers utilizing the second menu on the display device, the second machine identifier being associated with a second machine for performing at least the first manufacturing task;

determining a second process plan for performing at least the first manufacturing task utilizing the second machine identifier; and storing the second process plan in one or more databases.

3. The method of claim 1, further comprising:

displaying a plurality of tool identifiers in a third menu on a display device, the plurality of tool identifiers being stored in one or more databases;

selecting a first tool identifier from the plurality of tool identifiers utilizing the third menu, the first tool identifier being associated with a first tool for the first machine to perform at least the first manufacturing task;

defining a first tool travel profile for the first machine to perform the first manufacturing task, the first tool travel profile comprising a first plurality of travel path segments;

automatically calculating a first time period for the first machine to form the first and second features in the part based on the first plurality of travel path segments;

storing the first time period in one or more databases.

4. The method of claim 3, further comprising:

automatically identifying third and fourth features to be formed in the part by accessing third and fourth feature parameter data, respectively, stored in the CAD model of the part;

selecting at least a second manufacturing task identifier from the plurality of manufacturing task identifiers utilizing the first menu on the display device, the second manufacturing task identifier being associated with a second manufacturing task for forming the third and fourth features in the part;

selecting a second machine identifier from the plurality of machine identifiers utilizing the second menu, the second machine identifier being associated with a second machine for performing at least the second manufacturing task; and determining the first process plan for performing at least the first and second manufacturing tasks utilizing the first and second machine identifiers, respectively.

5. The method of claim 4, further comprising:

indicating whether the first and second machines have an operational capability to form the first and second features, respectively, the operational capability being determined based on first and second operational parameters associated with the first and second machines, respectively, stored in at least one database.

6. The method of claim 4, further comprising:

selecting a second tool identifier from the plurality of tool identifiers utilizing the third menu, the second tool identifier being associated with a second tool for the second machine to perform at least the second manufacturing task;

defining a second tool travel profile for the second machine to perform the second manufacturing task, the second tool travel profile comprising a second plurality of travel path segments; and automatically calculating a second time period for the second machine to form the third and fourth features in the part based on the second plurality of travel path segments.

7. The method of claim 6, further comprising automatically calculating a total time period to form the first, second, third, and fourth features in the part based on the first time period and the second time period.

8. The method of claim 1, wherein the CAD model comprises a feature-based CAD model.

9. A system for determining a process plan for forming at least one feature in a part, comprising:

a CAD database storing a CAD model of a part; and a computer operably coupled to the CAD database, the computer configured to automatically identify first and second features to be formed in the part by accessing first and second feature parameter data, respectively, stored in the CAD model of the part, the computer further configured to display a plurality of manufacturing task identifiers in a first menu on a display device, the plurality of manufacturing task identifiers being stored in one or more databases, the computer further configured to allow selection of at least a first manufacturing task identifier from the plurality of manufacturing task identifiers utilizing the first menu, the first manufacturing task identifier being associated with a first manufacturing task for forming the first and second features in the part, the computer further configured to display a plurality of machine identifiers in a second menu on the display device, the plurality of machine identifiers being stored in one or more databases, the computer further configured to allow selection of a first machine identifier from the plurality of machine identifiers utilizing the second menu, the first machine identifier being associated with a first machine for performing at least the first manufacturing task, the computer further configured to determine the first process plan for performing at least the first manufacturing task utilizing the first machine identifier and the first manufacturing task identifier, the computer further configured to store the first process plan in one or more databases.

10. The system of claim 9, wherein the computer is further configured to allow selection of a second machine identifier from the plurality of machine identifiers utilizing the second menu on the display device, the second machine identifier being associated with a second machine for performing at least the first manufacturing task, the computer further configured to determine a second process plan for performing at least the first manufacturing task utilizing the second machine identifier, the computer further configured to store the second process plan in one or more databases.

11. The system of claim 9, wherein the computer is further configured to display a plurality of tool identifiers in a third menu on a display device, the plurality of tool identifiers being stored in one or more databases, the computer further configured to allow selection of a first tool identifier from the plurality of tool identifiers utilizing the third menu, the first tool identifier being associated with a first tool for the first machine to perform at least the first manufacturing task, the computer further configured to define a first tool travel profile for the first machine to perform the first manufacturing task, the first tool travel profile comprising a first plurality of travel path segments, the computer further configured to automatically calculate a first time period for the first machine to form the first and second features in the part based on the first plurality of travel path segments, the computer further configured to store the first time period in one or more databases.

12. The system of claim 11, wherein the computer is further configured to automatically identify third and fourth features to be formed in the part by accessing third and fourth feature parameter data, respectively, stored in the CAD model of the part, the computer further configured to allow selection of at least a second manufacturing task identifier from the plurality of manufacturing task identifiers utilizing the first menu on the display device, the second manufacturing task identifier being associated with a second manufacturing task for forming the third and fourth features in the part, the computer further configured to allow selection of a second machine identifier from the plurality of machine identifiers utilizing the second menu, the second machine identifier being associated with a second machine for performing at least the second manufacturing task, the computer further configured to determine the first process plan for performing at least the first and second manufacturing task utilizing the first and second machine identifiers, respectively.

13. The method of claim 12, wherein the compute is further configured to indicate whether the first and second machines have an operational capability to form the first and second features, respectively, the operational capability being determined based on first and second operational parameters associated with the first and second machines, respectively, stored in at least one database.

14. The system of claim 12, wherein the computer is further configured to allow selection of a second tool identifier from the plurality of tool identifiers utilizing the third menu, the second tool identifier being associated with a second tool for the second machine to perform at least the second manufacturing task, the computer further configured to define a second tool travel profile for the second machine to perform the second manufacturing task, the second tool travel profile comprising a second plurality of travel path segments, the computer further configured to automatically calculate a second time period for the second machine to form the third and fourth features in the part based on the second plurality of travel path segments.

15. The system of claim 14, wherein the computer is further configured to automatically calculate a total time period to form the first, second, third, and fourth features in the part based on the first time period and the second time period.

16. The system of claim 9, wherein the CAD model comprises a feature-based CAD model.

17. An article of manufacture, comprising:
a computer storage medium having a computer program encoded therein for determining a process plan for forming at least one feature in a part, the computer storage medium comprising:

code for automatically identifying first and second features to be formed in the part by accessing first and second feature parameter data, respectively, stored in a CAD model of the part;

code for displaying a plurality of manufacturing task identifiers in a first menu on a display device, the plurality of manufacturing task identifiers being stored in one or more databases;

code for allowing selection of at least a first manufacturing task identifier from the plurality of manufacturing task identifiers utilizing the first menu, the first manufacturing task identifier being associated with a first manufacturing task for forming the first and second features in the part;

code for displaying a plurality of machine identifiers in a second menu on the display device, the plurality of machine identifiers being stored in one or more databases;

code for allowing selection of a first machine identifier from the plurality of machine identifiers utilizing the second menu, the first machine identifier being associated with a first machine for performing at least the first manufacturing task;

code for determining a first process plan for performing at least the first manufacturing task utilizing the first manufacturing task identifier and the first machine identifier and;

code for storing the first process plan in one or more databases.

18. The article of manufacturing of claim 17, wherein the computer storage medium further comprises:
code for selecting a second machine identifier from the plurality of machine identifiers utilizing the second menu on the display device, the second machine identifier being associated with a second machine for performing at least the first manufacturing task;

code for determining a second process plan for performing at least the first manufacturing task utilizing the second machine identifier; and code for storing the second process plan in one or more databases.

19. The article of manufacture of claim 17, wherein the computer storage medium further comprises:
code for displaying a plurality of tool identifiers in a third menu on a display device, the plurality of tool identifiers being stored in one or more databases;

code for allowing selection of a first tool identifier from the plurality of tool identifiers utilizing the third menu, the first tool identifier being associated with a first tool for the first machine to perform at least the first manufacturing task;

code for defining a first tool travel profile for the first machine to perform the first manufacturing task, the first tool travel profile comprising a first plurality of travel path segments;

code for automatically calculating a first time period for the first machine to form the first and second features in the part based on the first plurality of travel path segments; and code for storing the first time period in one or more databases.

20. The article of manufacture of claim 19, wherein the computer storage medium further comprises:
code for automatically identifying third and fourth features to be formed in the part by accessing third and fourth feature parameter data, respectively, stored in the CAD model of the part;

code for allowing selection of at least a second manufacturing task identifier from the plurality of manufacturing task identifiers utilizing the first menu of the display device, the second manufacturing task identifier being associated with a second manufacturing task for forming the third and fourth features in the part;

code for allowing selection of a second machine identifier from the plurality of machine identifiers utilizing the second menu, the second machine identifier being associated with a second machine for performing at least the second manufacturing task; and code for determining the first process plan for performing at least the first and second manufacturing tasks utilizing the first and second machine identifiers, respectively.

21. A method for determining a process plan for forming at least one feature in a part, comprising:

automatically identifying first and second features to be formed in the part by accessing first and second feature parameter data, respectively, stored in a CAD model of the part;

selecting at least a first manufacturing task identifier associated with a first manufacturing task for forming the first and second features in the part, the first manufacturing task identifier being selected from a plurality of manufacturing task identifiers stored in one or more databases;

selecting a first machine identifier associated with a first machine for performing at least the first manufacturing task, the first machine identifier being selected from a plurality of machine identifiers stored in one or more databases;

determining a first process plan for performing at least the first manufacturing task utilizing the first machine identifier and storing the first process plan in one or more databases;

selecting a first tool identifier associated with a first tool for the first machine to perform at least the first manufacturing task, the first tool identifier being selected from a plurality of tool identifiers stored in one or more databases;

defining a first tool travel profile for the first machine to perform the first manufacturing task, the first tool travel profile comprising a first plurality of travel path segments;

automatically calculating a first time period for the first machine to form the first and second features in the part based on the first plurality of travel path segments; and storing the first time period in one or more databases.

\* \* \* \* \*